3,192,170
BLOWING AGENT AND FOAMABLE RESINOUS COMPOSITION CONTAINING SAME

Karl-Ludwig Schmidt, Erwin Müller, and Hans Scheurlen, Leverkusen, and Friedrich Lober, Leverkusen-Bayerwerk, Germany, assignors to Farbenfabriken Bayer Aktiengesellschaft, Leverkusen, Germany, a corporation of Germany
No Drawing. Filed Feb. 10, 1959, Ser. No. 792,255
2 Claims. (Cl. 260—2.5)

This invention relates to blowing agents for foam materials and to a process for preparing such foam materials. Furthermore it relates to novel blowing agents.

It is known that foam materials can be produced from organic thermoplastic materials. These foam materials are produced by incorporating in the plastic an organic blowing agent which decomposes with evolution of gas at temperatures at which the thermoplastic material can be blown. As examples of substances used as organic blowing agents, aliphatic azo compounds, sulfohydrazides, oxalates of dicyandiamide or urea, nitrosoamides and nitrosourethanes, and also carboxylic acid azides, such as for example benzazide, may be mentioned. The carboxylic acid azides usually decompose spontaneously, often with detonation, so that the nitrogen is freed suddenly. The consequence of this is that the material to be blown has a ready tendency to form cracks and the pore structure of the foam material becomes irregular. In addition, such carboxylic acid azides are not easy to handle during their production, owing to the danger of detonation associated therewith.

It has now been found that N,N-disubstituted 5-amino-1,2,3,4-thia-triazoles are very suitable as blowing agents. These compounds can be characterized by the following general formula

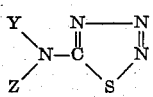

In this formula Y represents an aliphatic, especially lower alkyl radical and a cycloaliphatic radical, and Z represents an aliphatic, especially lower alkyl, cycloaliphatic or aromatic radical. The total number of carbon atoms in Y and Z together being not over 12 whereby Y and Z taken together with the amino-nitrogen can form a hetero cyclic ring which can contain additional hetero atoms as in the morpholyl or piperazyl radical. Furthermore, Y and Z can be part of a second N,N-disubstituted 5-amino-1,2,3,4-thia-triazole as in the N,N'-dimethyl-N, N'-bis-1,2,3,4-thia-triazolyl ethylenediamine or the N,N'-bis 1,2,3,4-thia-triazolyl piperazine.

The following are examples of such 5-amino thia triazoles which may be used according to the invention:

| | M.P. in ° C. |
|---|---|
| 5-dimethylamino-1,2,3,4-thia-triazole | 51–52 |
| 5-morpholyl-1,2,3,4-thia-triazole | 116–118 |
| 5-dicyclohexyl-amino-1,2,3,4-thia-triazol | |
| 5-piperidyl-1,2,3,4-thia-triazole | 28–29 |
| 5-N-methyl-anilino-1,2,3,4-thia-triazole | [1] 98 |
| N,N'-dimethyl-N,N'-bis - 1,2,3,4 - thia-triazoyl-ethylenediamine | [1] 148 |
| N,N'-bis-1,2,3,4-thia-triazolyl-piperazine | [1] 162 |

[1] With decomposition.

Suitable are furthermore those compounds which contain said amino thia-triazole grouping more than once in the molecule whereby said amino thia-triazole grouping can be connected by means of the substituents of the amino group as in the N,N'-dimethyl-N,N'-bis-1,2,3,4-thia-triazolyl ethylene diamine.

N,N'-disubstituted-5-amino-1,2,3,4-thia-triazoles can be obtained by the methods known per se from secondary amines by conversion into the dithiocarbamic acid salts, the reaction thereof with chloroacetic acid to the thiocarb-aminoyl thioglycolic acids and subsequent boiling of the thiocarbaminoyl thioglycolic acids with hydrazine hydrate (cf. K. A. Jensen "Journal für praktische Chemie" (2), 159, 191 (1941)) and subsequent nitrosation of the disubstituted thiosemicarbazides obtained.

The 5-amino-1,2,3,4-thia-triazoles used by the process of the invention give off their nitrogen gradually if they are heated to higher temperatures. Products which contain the 5-amino-1,2,3,4-thia-triazole grouping more than once in the molecule are especially suitable as blowing agents owing to the high gas yield. In addition, the 5-amino-thia-triazoles simultaneously split off sulfur during the thermal decomposition. This property is particularly advantageous, especially with the foaming of synthetic or natural rubber, insofar as part of the sulfur necessary for vulcanisation of the rubber is produced simultaneously by the blowing agent. The compounds used according to the invention have unlimited storability at room temperature. It is only at elevated temperatures (about 100° C. and above) that the aforementioned decomposition occurs. Only a weak detonation occurs on heating the compounds in the dry state.

For the production of blown materials by means of the new blowing agents, the procedure adopted is advantageously that the N,N-disubstituted 5-amino-1,2,3,4-thia-triazoles are incorporated into the material to be blown in known manner and, if required, in a mould, the material being heated to a temperature at which it becomes sufficiently pastic and at which decomposition of the blowing agent occurs with evolution of gas. Generally speaking, temperatures in the ranges from 100–200° C., preferably 140–180° C. are necessary for this purpose. It is of course also possible to add to the materials to be blown the conventional fillers, plasticizers or even other blowing agents which can be added in the usually applied amounts. The blowing agents can be incorporated in known manner in conventional mixing apparatus, it being preferred to use quantities of from 0.1–30, preferably 0.5–20%, based on the material to be blown. It is, however, also possible to use larger or smaller quantities.

As carrier substances for the production of foam materials it is possible to use thermoplastic compositions such as polyvinyl chloride, polyethylene, polystyrene, polyisobutylene, and also thermosetting materials, such as phenol-formaldehyde resins and urea-formaldehyde resins, and polyester resins, polyurethanes, silicone resins and epoxy resins. Rubber-like substances such as natural rubber and polymerisation products of conjugated diolefins such as butadiene, dimethylbutadiene, isoprene or copolymers thereof with polymerisable vinyl compounds such as styrene, α-methylstyrene, acrylonitrile, methacrylonitrile, acrylates and methacrylates are also suitable. Furthermore there can be used silicone rubber. When using synthetic or artificial rubber, the process according to the invention can be combined in the usual manner with vulcanisation, the sulfur necessary for this being supplied in part by decomposition of the blowing agent.

The foam materials obtained according to the present process are characterized by a very low specific gravity and extremely uniform pore structure. They are practically odorless and white. The compounds described in "Berichte der Deutschen Chemischen Gesellschaft," vol. 29, pages 2491/99 which contain only one substituent impart a strong odor to the foamed materials if used as blowing agents. The following examples further illustrate the invention without limiting it thereto.

This application is a continuation-in-part of our copending application, Serial Number 633,337, filed June 4, 1957, now abandoned.

*Example 1*

Into a plastisol consisting of 100 grams of polyvinylchloride powder and 100 grams of dioctyl-phthalate are intimately mixed 4 grams of sodium bicarbonate and 30 grams of 5-morpholyl-1,2,3,4-thia-triazole. The mixture obtained is placed in a gas-tight closable mould and heated to 170° C. for 20 minutes under pressure. The mould is cooled to room temperature and the unfinished article obtained is blown for a short time in a heating chamber at 100° C. In this way a colorless, odorless elastic foam material with pores having a diameter of about 0.5 millimeter and a specific gravity of 0.08 g./cc. is obtained.

The 5-morpholyl-1,2,3,4-thia-triazole was obtained by adding dropwise an aqueous sodium nitrite solution to an aqueous hydrochloric acid solution of morpholyl-thiocarbamic acid hydrazide at 5–10° C. The 1,2,3,4-thia-triazole formed precipitates and is filtered off; M.P. 116–118° C. (with decomposition).

*Example 2*

A mixture consisting of 150 grams of a polyvinylchloride powder, 50 grams of an aromatic polyether as plasticizer and 20 grams of N,N-dimethyl-5-amino-1,2,3,4-thia-triazole are heated in a gas-tight closable mould slowly up to a temperature of 160° C., this temperature then being maintained for about 15 minutes. Upon cooling to room temperature the unfinished article obtained is blown for about half an hour in a heating chamber at 100° C. In this way a foam material with uniform pores and a specific gravity of 0.12 g./cc. is obtained.

The N,N-dimethyl-5-amino-1,2,3,4-thia-triazole is obtained in analogous manner as described in Example 1.

*Example 3*

300 grams of granulated polyethylene having a molecular weight of 20–25,000 are mixed with 3 grams of finely divided N,N - dimethyl-5-amino-1,2,3,4-thia-triazole. By means of a warm extruder metal wires are coated at a temperature of 150–170° C. with a polyethylene foam formed at this temperature. The foam has small uniform pores, an even surface and a specific gravity of about 0.45 g./cc. The metal wire coating obtained in this manner has excellent electric insulation properties.

*Example 4*

200 grams of a polystyrene powder are intensely mixed with 20 grams of 5-morpholyl-1,2,3,4-thia-triazole and then heated in a gas-tight closable mould to 160° C. for 10 minutes. The unfinished article obtained is blown for about 30 minutes in a heating chamber at 130° C. The foam material thus obtained has a specific gravity of 0.12 g./cc.

*Example 5*

300 grams of a liquid phenol-formaldehyde resin containing still free phenol and formaldehyde are mixed with 20 grams of 5-morpholyl-1,2,3,4-thia-triazole and heated to about 100° C. Thereby no gas formation is observed. Upon addition of 20 grams of p-toluol sulfonic acid the material hardens more and more while the temperature rises and the blowing agent decomposes while the material is foamed. A foam material is obtained having a specific gravity of 0.15 g./cc.

The phenol-formaldehyde resin was obtained by reacting 100 grams of phenol, 140 grams of a 32% solution of formaldehyde, subsequently neutralizing the reaction mixture with sulfuric acid and distilling off such an amount of water that the water content of the remaining mixture is below 10%.

*Example 6*

The following mixture was cured in a mould at a temperature of 151° C. for about 35 minutes:

100 parts of pale crepe
10 parts of zinc oxide
3 parts of sulfur
1.5 parts of tetramethyl thiuram disulfide
80 parts of chalk
17 parts of mineral oil
3 parts of stearic acid
2 parts of paraffin
3 parts of N,N-dimethyl-N,N'-bis-1,2,3,4-thia-triazolyl-ethylene diamine Upon cooling off a foamed material is obtained showing an increase in volume of 600%.

*Example 7*

The following mixture was cured in a mould at a temperature of 151° C. for about 35 minutes:

100 parts of a copolymer obtained from butadiene and acrylonitrile with an acrylonitrile content of 30% (type "perbunan 3805")
10 parts of zinc oxide
3 parts of sulfur
1.5 parts of tetramethyl thiuram disulfide
40 parts of dibutyl phthalate
10 parts of inactive carbon black
2 parts of stearic acid
0.8 parts of aldol α-naphthylamine
3 parts of 5-morpholyl-1,2,3,4-thia-triazole Upon cooling off a foamed material is obtained showing an increase in volume of 700%.

*Example 8*

The following mixture was cured in a mould at a temperature of 151° C. for about 35 minutes:

100 parts of a copolymer obtained from butadiene and styrene with a styrene content of 28% (type "Buna S3")
5 parts of zinc oxide
2 parts of sulfur
1.5 parts of tetramethylthiuram disulfide
60 parts of china clay
20 parts of a petrol origin softener (type "Naftolen ZD")
3 parts of stearic acid
2 parts of paraffin
3 parts of 5-dimethyl-amino-1,2,3,4-thia-triazole Upon cooling off a foamed material is obtained showing an increase in volume of 500%.

*Example 9*

The following mixture was cured in a mould at a temperature of 151° C. for about 35 minutes:

100 parts of a chloroprene (type "Neopren WRT")
30 parts of china clay
20 parts of dibutyl phthalate
10 parts of active zinc oxide
10 parts of factis
10 parts of active carbon black
0.5 part of an accelerator
5 parts of magnesia
3 parts of 5-dimethyl-amino-1,2,3,4-thia-triazole Upon cooling off a foamed material is obtained showing an increase in volume of 500%.

We claim:

1. A composition capable of forming a foamed plastic on heating comprising a resin selected from the group consisting of synthetic and natural rubber having incorporated therein 0.1 to 30% by weight of a blowing agent having the formula:

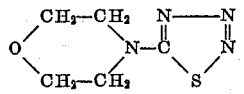

2. A compound of the formula:

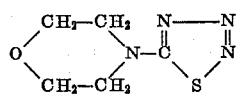

References Cited by the Examiner
UNITED STATES PATENTS

| | | | |
|---|---|---|---|
| 2,410,619 | 11/46 | Allen et al. | 260—308 |
| 2,619,489 | 11/52 | Horlein | 260—306.8 |
| 2,739,134 | 3/56 | Parry et al. | 260—2.5 |
| 2,746,939 | 5/56 | Beaver | 260—2.5 |
| 2,806,035 | 9/57 | Margot et al. | 260—308 |
| 2,950,280 | 8/60 | Zimmer | 260—2.5 |
| 2,966,495 | 12/60 | Song et al. | 260—306.8 |

FOREIGN PATENTS

| | | |
|---|---|---|
| 508,982 | 1/55 | Canada. |
| 801,825 | 9/58 | Great Britain. |

JOSEPH L. SCHOFER, *Primary Examiner.*
D. ARNOLD, L. J. BERCOVITZ, *Examiners.*